(12) United States Patent
Tripathi et al.

(10) Patent No.: US 7,363,383 B2
(45) Date of Patent: Apr. 22, 2008

(54) RUNNING A COMMUNICATION PROTOCOL STATE MACHINE THROUGH A PACKET CLASSIFIER

(75) Inventors: Sunay Tripathi, San Jose, CA (US); Bruce W. Curtis, Sunnyvale, CA (US)

(73) Assignee: Sun Microsytems, Inc., Santa Clara, CA (US)

( * ) Notice: Subject to any disclaimer, the term of this patent is extended or adjusted under 35 U.S.C. 154(b) by 929 days.

(21) Appl. No.: 10/683,959

(22) Filed: Oct. 10, 2003

(65) Prior Publication Data

US 2005/0138189 A1   Jun. 23, 2005

Related U.S. Application Data

(60) Provisional application No. 60/465,147, filed on Apr. 23, 2003.

(51) Int. Cl.
  *G06F 15/173* (2006.01)
  *G06F 15/16* (2006.01)
  *G06F 9/44* (2006.01)
  *G06F 3/00* (2006.01)
  *G06F 9/46* (2006.01)
  *G06F 13/00* (2006.01)

(52) U.S. Cl. .................. 709/230; 709/226; 709/236; 709/240; 709/245; 709/246; 719/318; 718/101; 370/231

(58) Field of Classification Search ............... 709/226, 709/230, 236, 240, 245, 246; 719/318; 718/101; 370/231
See application file for complete search history.

(56) References Cited

U.S. PATENT DOCUMENTS 6,788,680 B1 * 9/2004 Perlman et al. ............. 370/389

(Continued)

FOREIGN PATENT DOCUMENTS

EP        1191438 A2 *  3/2002

OTHER PUBLICATIONS

Clark, D.D. et al. "An Analysis of TCP Processing Overhead," IEEE Communications Magazine, vol. 40, Issue 5, May 2002, pp. 94-101.*

(Continued)

*Primary Examiner*—Jason D Cardone
*Assistant Examiner*—Melvin H Pollack
(74) *Attorney, Agent, or Firm*—Martine Penilla & Gencarella, LLP

(57) ABSTRACT

One embodiment of the invention relates to processing communication packets. A communication packet belongs to a communication data structure (called "conn") which is unique to a connection including the communication packet. The conn also contains an event list which is a sequential list of functions necessary to process the packet. An event list is selected from a database based on the protocol layers necessary to process the packet and typically contains as many functions as there are layers in between. Therefore, each layer has a functional entry point as an event in the event list. The event list identifies a plurality of communication modules specific for the connection and an ordering thereof. The packet is processed through the plurality of modules based on the ordering. The event list is manipulated to enable a module of the plurality of communication modules to enter one of a plurality of its operational states.

34 Claims, 10 Drawing Sheets

U.S. PATENT DOCUMENTS

| | | | | |
|---|---|---|---|---|
| 6,813,243 | B1* | 11/2004 | Epps et al. | 370/235 |
| 6,876,657 | B1* | 4/2005 | Brewer et al. | 370/394 |
| 6,934,745 | B2* | 8/2005 | Krautkremer | 709/223 |
| 6,965,599 | B1* | 11/2005 | Sakurai et al. | 370/392 |
| 7,002,965 | B1* | 2/2006 | Cheriton | 370/395.32 |
| 7,028,091 | B1* | 4/2006 | Tripathi et al. | 709/230 |
| 7,035,212 | B1* | 4/2006 | Mittal et al. | 370/230 |
| 7,042,848 | B2* | 5/2006 | Santiago et al. | 370/253 |
| 7,061,874 | B2* | 6/2006 | Merugu et al. | 370/255 |
| 7,103,055 | B2* | 9/2006 | Kadambi et al. | 370/409 |
| 7,124,196 | B2* | 10/2006 | Hooper | 709/232 |
| 7,133,400 | B1* | 11/2006 | Henderson et al. | 370/389 |
| 7,200,114 | B1* | 4/2007 | Tse-Au | 370/231 |
| 7,215,637 | B1* | 5/2007 | Ferguson et al. | 370/230.1 |
| 7,222,150 | B1* | 5/2007 | Phillips et al. | 709/202 |
| 7,248,584 | B2* | 7/2007 | Hooper | 370/392 |
| 7,260,096 | B2* | 8/2007 | Basso et al. | 370/392 |
| 7,284,070 | B2* | 10/2007 | Boucher et al. | 709/250 |
| 7,298,705 | B2* | 11/2007 | Shankar et al. | 370/249 |
| 2003/0225870 | A1* | 12/2003 | Sandadi et al. | 709/223 |
| 2004/0117802 | A1* | 6/2004 | Green | 719/318 |
| 2004/0151120 | A1* | 8/2004 | Shankar et al. | 370/249 |
| 2005/0097226 | A1* | 5/2005 | Tripathi | 709/250 |
| 2005/0122970 | A1* | 6/2005 | Tripathi et al. | 370/389 |

OTHER PUBLICATIONS

O'Mahony, M. J. et al. "The Application of Optical Packet Switching in Future Communication Networks," IEEE Communications Magazine, vol. 39, Issue 3, Mar. 2001, pp. 128-135.*

Feldmeier, D. C. "Protocol Boosters," IEEE Journal on Selected Areas in Communications, vol. 16, Issue 3, Apr. 1998, pp. 437-444.*

Sharma, G. D. et al. "Time Warp Simulation on Clumps," Proceedings of 13th Workshop on Parallel and Distributed Simulation, May 1999, pp. 174-181.*

* cited by examiner

CONN_T a
313

| | POINTER |
|---|---|
| CONN_RECV (510) | 511 |
| CONN_RECV_CURRENT (520) | 521 |
| CONN_SEND (530) | 531 |
| CONN_SEND_CURRENT (540) | 541 |

CONNECTION 321

CONN_T b
314

| | POINTER |
|---|---|
| CONN_RECV (550) | 551 |
| CONN_RECV_CURRENT (560) | 561 |
| CONN_SEND (570) | 571 |
| CONN_SEND_CURRENT (580) | 581 |

CONNECTION 331

Fig. 5

RUNNING A COMMUNICATION PROTOCOL STATE MACHINE THROUGH A PACKET CLASSIFIER

CROSS REFERENCE TO RELATED APPLICATIONS

The present patent application claims benefit to U.S. Provisional Patent Application No. 60/465,147 filed Apr. 23, 2003, entitled Vertical Perimeter Protection Mechanism, by Sunay Tripathi, assigned to the assignee of the present invention, and which is hereby incorporated by reference in its entirety herein.

U.S. patent application Ser. No. 10/683,933 entitled "A System And Method For Vertical Perimeter Protection" by Sunay Tripathi and Bruce W. Curtis, assigned to the assignee of the present invention, filed Oct. 10, 2003 and which is incorporated by reference in its entirety herein.

U.S. patent application Ser. No. 10/683,897 entitled "A Method and System for Processing Communications Packets According to Event Lists" by Sunay Tripathi and Eric Nordmark, assigned to the assignee of the present invention, filed Oct. 10, 2003 and which is incorporated by reference in its entirety herein.

U.S. patent application Ser. No. 10/683,720 entitled "Multi Thread Accept Mechanism in a Vertical Perimeter Communications Environment" by Sunay Tripathi, assigned to the assignee of the present invention, filed Oct. 10, 2003 and which is incorporated by reference in its entirety herein.

U.S. patent application Ser. No. 10/683,934 entitled "A Method For Batch Processing Received Message Packets" by Sunay Tripathi and Sumanth R. Kamatala, assigned to the assignee of the present invention, filed Oct. 10, 2003 and which is incorporated by reference in its entirety herein.

U.S. patent application Ser. No. 10/683,762 entitled "A Method and System For Transmitting Packet Chains" by Sunay Tripathi, Cahya Masputra and Bruce W. Curtis, assigned to the assignee of the present invention, filed Oct. 10, 2003 and which is incorporated by reference in its entirety herein.

BACKGROUND

Computer systems typically utilize a software layered approach for implementing communication frameworks where a layer is a program module for processing different portions of data transmitted from a producer to a consumer. The software layered approach requires examination of data by each layer (e.g., a socket layer, a TCP layer, an IP security layer, a firewall layer, an IP layer, etc.) to determine if any processing needs to be performed by that layer before sending the data to the next layer. This examination process is done through all layers and typically requires computer instructions and data to be read and processed by a central processing unit(s) (CPU), thereby consuming CPU cycles and therefore time. In many cases, even if a given layer or "module" is not enabled for the data channel, the data packet of the channel is still examined by the module to determine if processing by that module is needed. Thus, a strictly layered approach to a communication framework processes data packets through stacked layers even if some of the layers are not applicable to the data packet.

One type of conventional framework utilizes a layered approach to build communication services; examples being a protocol stack or a terminal interface. Implementing protocol processing code as a layer allows great flexibility in writing code and delivering packets to the next layer by means of common entry points into the layer. In a conventional approach, a layer registers an entry point which is a common function called to handle any incoming packets. The layer then needs to examine the packet header and the internal connection state structure to decide which function actually needs to process the packet. In a protocol like TCP which is a stateful protocol, looking at the current state and the packet header determines how the packet is going to be processed. Since the number of states possible for a TCP connection are many and the packet header can have many flags, a significant number of instruction are required to figure out the correct function to process an incoming packet.

SUMMARY

One embodiment in accordance with the invention relates to processing communication packets. Specifically, a communication packet belongs to a communication data structure which is unique to a connection that includes the communication packet. The communication data structure called "conn" also contains an event list which is a sequential list of functions necessary to process the packet. An event list is selected from a database based on the protocol layers necessary to process the packet and typically contains as many functions as there are layers in between. As such, each layer has a functional entry point as an event in the event list. The event list identifies a plurality of communication modules specific for the connection and an ordering thereof. The communication packet is processed through the plurality of communication modules based on the ordering. The event list is manipulated to enable a communication module of the plurality of communication modules to enter one of a plurality of operational states associated with the communication module.

In another embodiment, the present invention provides a method of processing communication packets. The method includes assigning a first communication packet to a first communication data structure which is unique to a first connection that includes the first communication packet. Additionally, the method includes selecting a first event list from a database. The first event list is selected based on a classification of the first communication packet. The first event list identifies a first plurality of communication modules specific for the first connection and an ordering thereof. Furthermore, the method includes processing the first communication packet through the first plurality of communication modules based on the ordering. The method also includes manipulating the first event list to enable a communication module of the first plurality of communication modules to enter one of a plurality of operational states associated with the communication module.

In yet another embodiment, the present invention provides a method of processing communication packets within a communication framework including a first plurality of modules. The method includes assigning a communication packet to a communication data structure which is unique to a connection that includes the communication packet. The method also includes selecting an event list from a database based on a classification of the communication packet. The event list identifying a second plurality of modules specific for the connection and an ordering thereof. The second plurality is a subset of the first plurality. Furthermore, the method includes processing the communication packet through the second plurality of modules based on the ordering. Additionally, the method includes changing the event list to enable a module of the second plurality of modules to enter one of a plurality of operational states associated with the module.

In still another embodiment, the present invention provides a communication system. The communication system includes a first plurality of communication modules for processing communication packets. Additionally, the communication system includes a database. The database includes a first event list indicating a second plurality of communication modules for processing communication packets and an ordering thereof. The second plurality is a subset of the first plurality. A communication module of the second plurality of communication modules is for modifying the first event list. The database also include a second event list indicating a third plurality of communication modules for processing communication packets and an ordering thereof. The third plurality is a subset of the first plurality and is different from the second plurality. A communication module of the third plurality of communication modules is for modifying the second event list. The communication system also includes a classifier for classifying respective communication packets and based thereon for assigning respective communication packets to one of the first and second event lists for processing thereof. The communication packets are of a common communication connection and are processed through the same event list.

While particular embodiments of the present invention have been specifically described within this summary, it is noted that the invention is not limited to these embodiments. The invention is intended to cover alternatives, modifications and equivalents which may be included within the scope of the invention as defined by the claims.

BRIEF DESCRIPTION OF THE DRAWINGS

FIG. 5 shows exemplary memory resident connection data structures in accordance with embodiments of the present invention.

DETAILED DESCRIPTION

Figure 1:
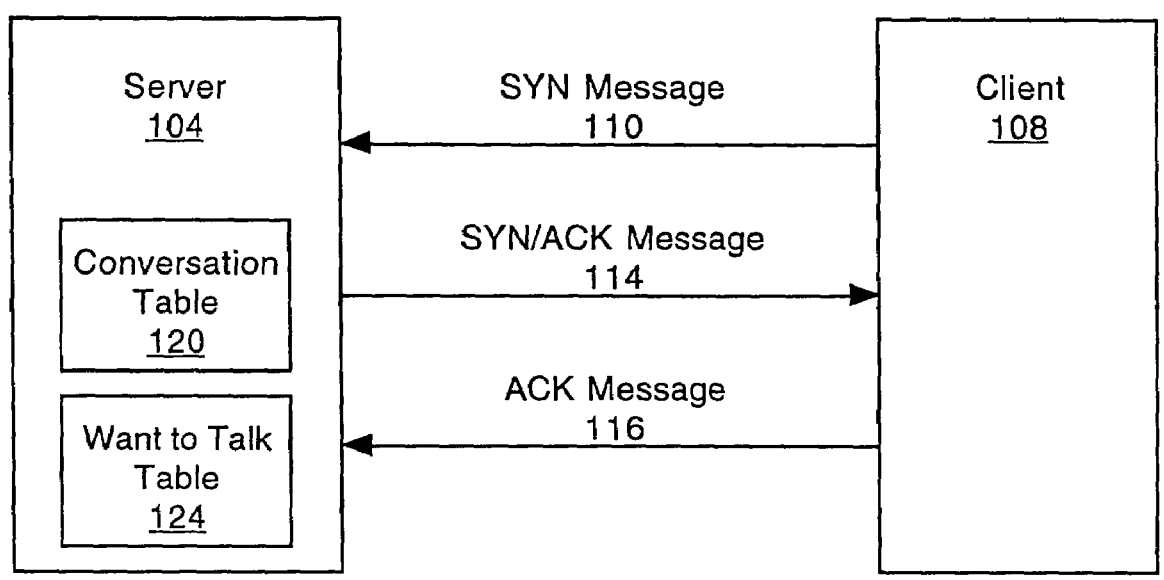
FIG. 1 is a data flow block diagram of an exemplary server-client system wherein a three-way handshake is used to create a communication connection in accordance with an embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals may be referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "assigning", "selecting", "processing", "manipulating", "modifying", "changing", "classifying", "accessing", "ascertaining", "determining", "initiating", "enabling", "controlling", "transmitting", "receiving", "generating", "utilizing", "storing" or the like, refer to the action and processes of a computing system, or similar electronic computing device, that manipulates and transforms data. The data is represented as physical (electronic) quantities within the computing system's registers and memories and can be transformed into other data similarly represented as physical quantities within the computing system's memories or registers or other such information storage, transmission, or display devices.

FIG. 1 is a data flow block diagram of an exemplary server-client system 100 wherein a three-way handshake is executed to establish a TCP connection between a server 104 and a client 108 in accordance with embodiments of the present invention. The three-way handshake is initiated from the client 108 with a "SYN" (synchronous) message 110 from one unique address to the server 104 (e.g., TCP/IP server). The SYN message 110 notifies the server 104 that the client 108 desires to communicate. At the first part of the handshake, the client 108 first sends the server 104 its address and the server 104 logs the address in a table 124 of clients that want to talk. For the second part of the handshake, the server 104 sends a "SYN/ACK" (synchronous/acknowledgement) message 114 back to the client 108 to let the client know that it can begin to communicate with the server 104. For the third part of the handshake, the client 108 then sends an "ACK" message 116 back to the server 104 and begins communication with server 104. Once the client 108 begins to communicate with the server 104, the server 104 moves the client 108's address from the table 124 (clients who want to talk) to a table 120 (clients in conversation).

Figure 2:
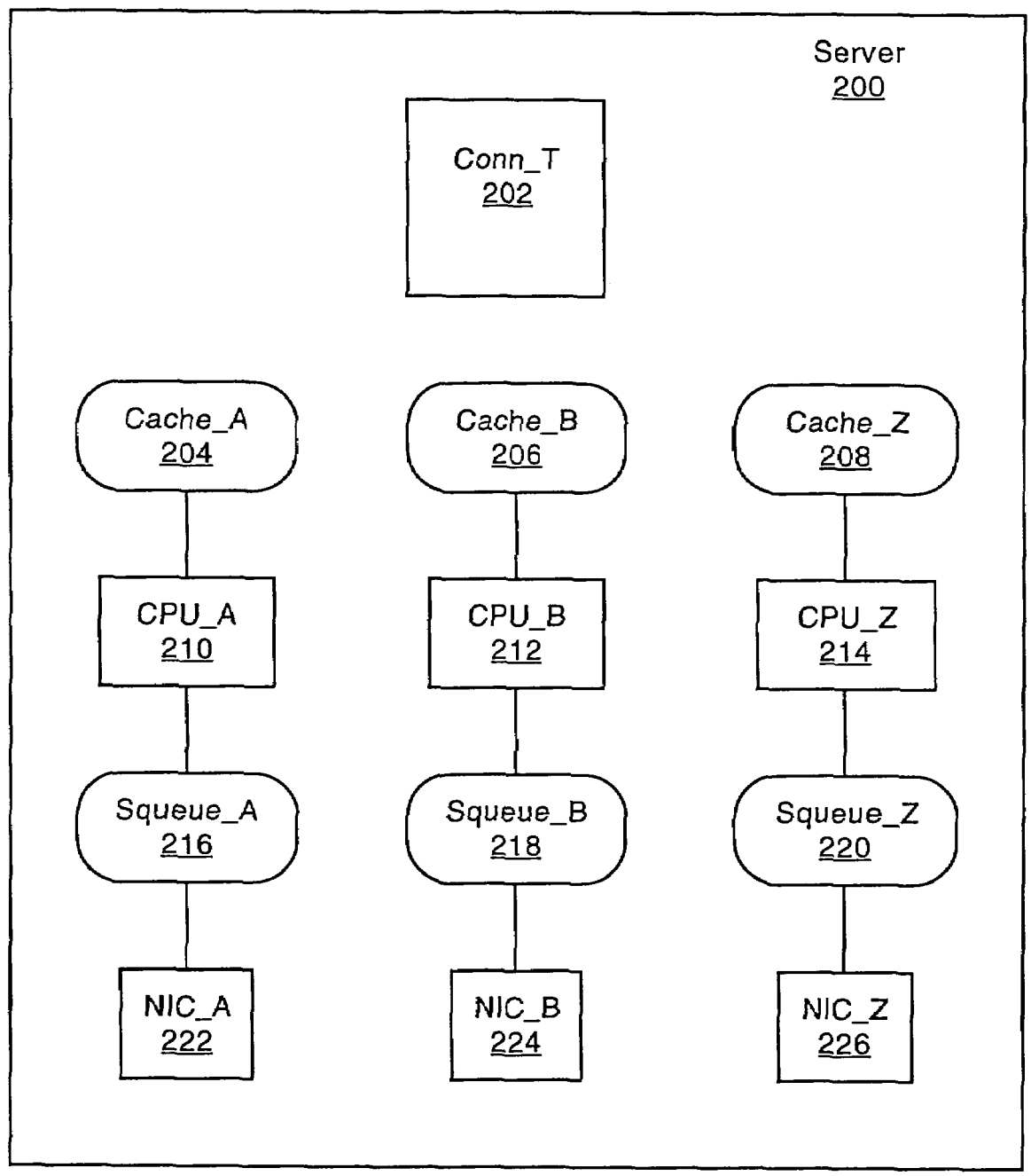
FIG. 2 is a block diagram of an exemplary multiprocessor server system including network interface cards in accordance with an embodiment of the present invention.

FIG. 2 is a block diagram of an exemplary multiprocessor server system 200 including network interface cards (NICs) (e.g., 222, 224, and 226) that provide a connection interface to a client (e.g., a port) in accordance with an embodiment of the present invention. Exemplary server 200 also includes central processing units (CPUs) or processors 210, 212 and 214 wherein each NIC is assigned and coupled to a specific CPU. For example, NIC_A 222 is assigned and coupled to CPU_A 210, NIC_B 224 is assigned and coupled to CPU_B 212, and NIC_Z 226 is assigned and coupled to CPU_Z 214. The present embodiment provides a system for per CPU synchronization called "vertical perimeters" inside protocol modules such as, but not limited to, a IP module, a TCP module, and a socket module. The vertical perimeter can be implemented using a serialization queue (squeue) or data structure.

The functionality of the squeue is described as follows. Each CPU of the server system 200 has an associated squeue (serialized queue) for queuing packets destined for the associated CPU. For example, squeue_A 216 queues packets destined for CPU_A 210, squeue_B 218 queues packets destined for CPU_B 212; and squeue_Z 220 queues packets destined for CPU_Z 214. Additionally, squeue_A 216 is coupled to both CPU_A 210 and NIC_A 222, squeue_B 218 is coupled to both CPU_B 212 and NIC_B 224, while squeue_Z 220 is coupled to both CPU_Z 214 and NIC_Z 226. It is noted that each CPU has an optional associated cache memory for storing connection information for current connections. For example, cache_A 204 is associated with and coupled to CPU_A 210 and could store information about connections associated with CPU_A 210. Likewise, cache_B 206 is associated with and coupled to CPU_B 212 while cache_Z 208 is associated with and coupled to CPU_Z 214. Additionally, embodiments of the present invention use a connection data structure referred to as a conn_t that classifies each connection and provides routing information such that all packets associated with the connection are routed to a single assigned processor or CPU. The details of the conn_t connection structure are discussed in greater detail below. Both conn_t and squeue data structures can reside in computer memory.

As described further below, the squeue structure queues tasks to be performed by its associated processor. In one embodiment of the present invention, this includes the processing of a communication packet that may be associated with a TCP connection. For example, once a data packet is processed, a common processor will pass the packet and process the packet through different protocol modules or layers. Furthermore, the same processor will similarly process all other packets of that TCP connection.

As described below, the conn_t data structure can be used and associated with a TCP connection and can be used to route packets to their respective processors. This is true for both in-bound and out-bound packets.

Within the present embodiment, the connection data structure (e.g., conn_t) lookup for inbound packets can be done outside the perimeter, using an IP connection classifier, as soon as a packet reaches the IP module. Based on the classification, the conn_t (connection structure) is retrieved from a memory resident conn_t table 202. Advantageously, the IP classification lookup occurs outside of the perimeter, thus effectively binding a connection to an instance of the vertical perimeter or squeue when the connection is initialized. As a result, all packets for the same connection are processed on the squeue to which it is bound. This means that the same processor or CPU processes packets of a state connection. Advantageously, processing all packets associated with a connection on the same processor decreases processing time for the packet by reducing data state conflicts between protocol layers, for instance. Furthermore, a localized cache can be used to further decrease processing time.

Within FIG. 2, the conn_t 202 is used for storing a sequence of function calls necessary for all inbound and outbound packets. For example, the conn_t 200 stores a TCP sequence identifier that provides an entry point for a TCP module. In accordance with an embodiment of the present invention, the message-passing interface can be a BSD (Berkeley software distribution) style of function call interface, for instance.

When an incoming packet is received from a NIC (e.g., 224), an interrupt thread classifies the packet and retrieves the connection structure (e.g., conn_t) and the instance of the vertical perimeter, on which the packet is to be processed. For example, a connection is associated with a vertical perimeter instance and all packets for that connection are processed on that vertical perimeter. For a new incoming connection, the connection is assigned to the vertical perimeter instance attached to the interrupted CPU associated with the NIC on which the connection was received.

It is noted that the vertical perimeter or squeue has the property that only one thread can process the queue at any time. If the queue is being processed, any other thread trying to process its packet (both inbound or outbound) is required to queue the packet on the squeue which is picked up later by a squeue worker thread for processing in sequential order. A particular communication connection is assigned to a particular squeue at the time of creation and all packets for that connection are always processed using the synchronization offered by the squeue. As such, once a processing starts for the packet, it goes through all the protocol layers without requiring additional mutual exclusion. The vertical perimeter or squeue also protects the connection state from multiple threads because the single threaded property of the squeue ensures that only one thread is accessing and modifying the connection state.

Figure 3A:
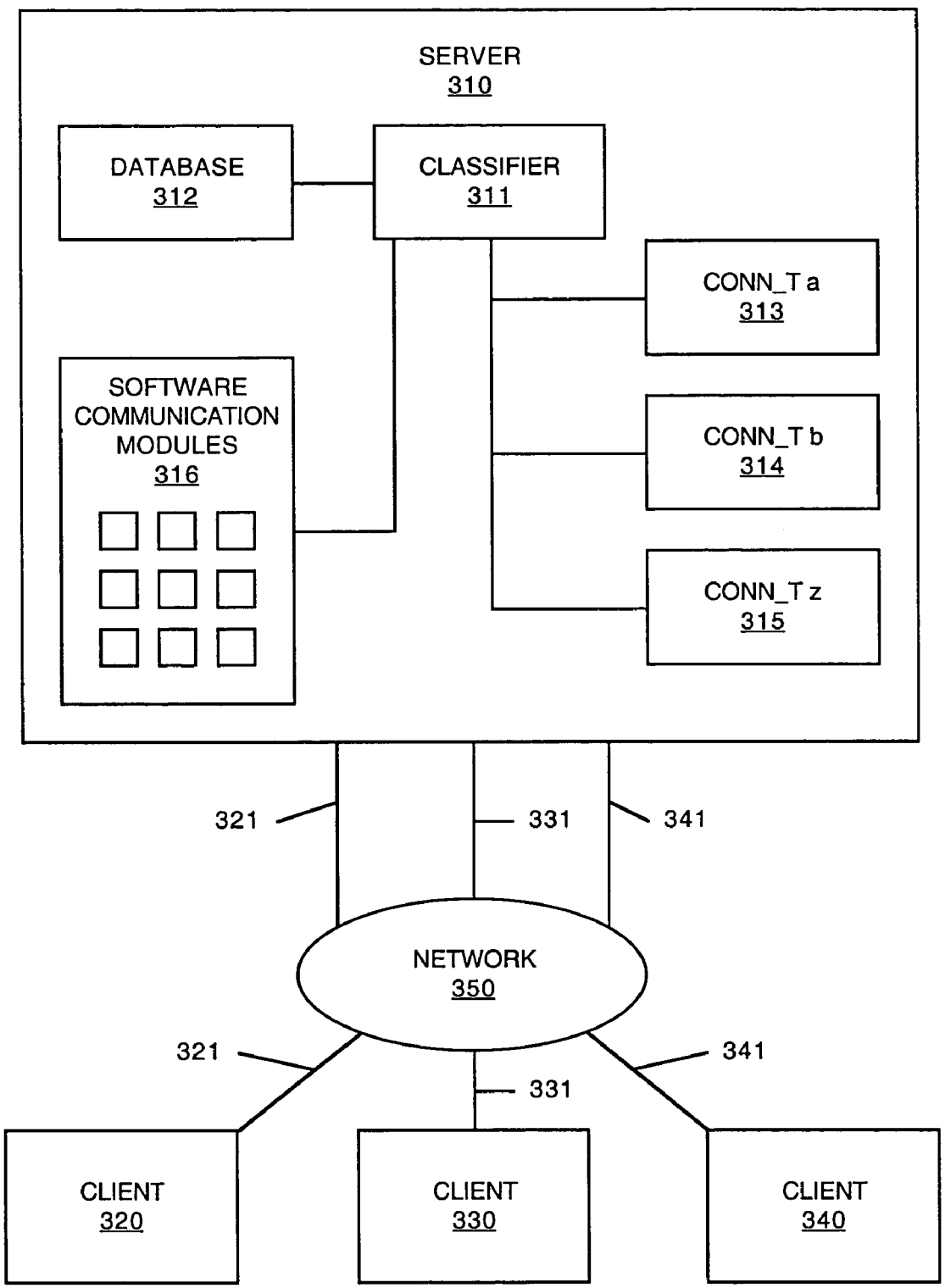
FIG. 3A is a block diagram of an exemplary communications network upon which embodiments of the present invention may be implemented.

FIG. 3A is a block diagram of an exemplary communications network 300 upon which embodiments of the present invention may be implemented. In FIG. 3A, a server 310 is communicatively coupled with clients 320, 330 and 340 via communications network 350. In the embodiment of FIG. 3A, each client communicates with server 310 using a unique, identifiable connection. For example, connection 321 couples client 320 with server 310 but does not couple either client 330 or client 340 with server 310. Similarly, client 330 communicates with server 310 via a unique connection 331, and client 340 communicates with server 310 via connection 341.

It is noted that communications network 350 can be implemented in a wide variety of ways in accordance with the present embodiment. For example, communications network 350 can be implemented as, but is not limited to, a local area network (LAN), a metropolitan area network (MAN), a wide area network (WAN) and/or the Internet. Additionally, server 310 and clients 320, 330 and 340 can each be communicatively coupled to communications network 350 via wired and/or wireless communication technologies.

In embodiments of the present invention, each connection between server 310 and a client with which it is communicating may be identified using the local IP address and local port number of server 310 along with the remote IP address and remote port number of that client. For example, connection 321 is identified by server 310 using its local IP address and the local port number that the connection is using. Additionally, connection 321 is identified by server 310 using the remote IP address of client 320 and the remote port number of client 320 that the connection is using. Similarly, connection 331 is identified by the local IP address and port number of server 310 that the connection is using, and the remote IP address and port number of client 330 that the connection is using. This classification of the connections may be performed by a classifier 311 of server 310.

Within FIG. 3A, also operable on server 310 are a plurality of connection data structures (e.g., conn_t a 313, conn_t b 314, and conn_t z 315). These data structures are created when a connection is initially established between server 310 and another client for traffic in either direction. In embodiments of the present invention, a data structure comprising data used in processing communications (e.g., state information for the connection, pointers to other structures and functions, read and write queues, addresses and port numbers, data packet sequence numbers, etc.) is uniquely assigned to one connection only. For example, conn_t a 313 is a data structure uniquely describing the connection 321 between server 310 and client 320. Similarly, data structure conn_t b 314 can include data that uniquely describes the connection 331 between server 310 and client 330 while conn_t z 315 can describe the connection 341 between server 310 and client 340. Generally, many individual data packets are associated with each connection.

When a new connection is established between server 310 and another client (e.g., 320), classifier 311 assigns the connection to its own unique data structure (e.g., conn_t a 313). For example, the subsequent communication packets sent or received between server 310 and client 320 via connection 321 are interrogated to determine their connection and are processed using the information in the data structure of conn_t a 313. It is appreciated that more than one connection can exist between a particular client (e.g., 320) and server 310. In embodiments of the present invention, each of those connections receives its own unique data structure describing that particular connection.

Also shown in FIG. 3A is a database 312 that can be accessed by classifier 311. In embodiments of the present invention, database 312 includes a plurality of initial event lists. Each event list identifies a plurality of software communication modules that are used to process the incoming and outgoing communication packets. Once assigned to an event list, the data packet will be processed by the modules identified by the event list by calling each function in the event list. In embodiments of the present invention, an initial send event list and an initial receive event list are selected by classifier 311 based upon the type of connection being established between server 310 and another client (e.g., 320) depending upon whether an inbound and/or outbound connection is established. Pointers to those event lists are then placed in a conn_t (e.g., conn_t a 313) for the connection (e.g., 321) and are used when processing communication packets for that connection. It is appreciated that, in embodiments of the present invention, database 312 can reside on server 310, on another computer (not shown) and/or on storage that is communicatively coupled with server 310.

Also operable on server 310 is a repository of software communication modules 316. In embodiments of the present invention, these communication modules 316 are stored as a library of communication modules for processing communication packets and performing communication protocol functionalities. It is appreciated that repository 316 may be resident upon server 310, upon another computer (not shown) and/or upon storage communicatively coupled with server 310. Some examples of software communication modules that may be utilized in embodiments of the present invention include, but are not limited to, a sockets file system module, a Transport Control Protocol (TCP) module, an IP module, a firewall module, an IP security module (e.g., an encryption/decryption module), a Network Computing Architecture™ (NCA) module, a Carrier Grade Transport Protocol (CGTP) module, an IP multipath module, a clustering module, a Quality of Service (QOS) module, etc. In embodiments of the present invention, these modules are accessed via a function stored in the event list used to process a communication packet.

Figure 3B:
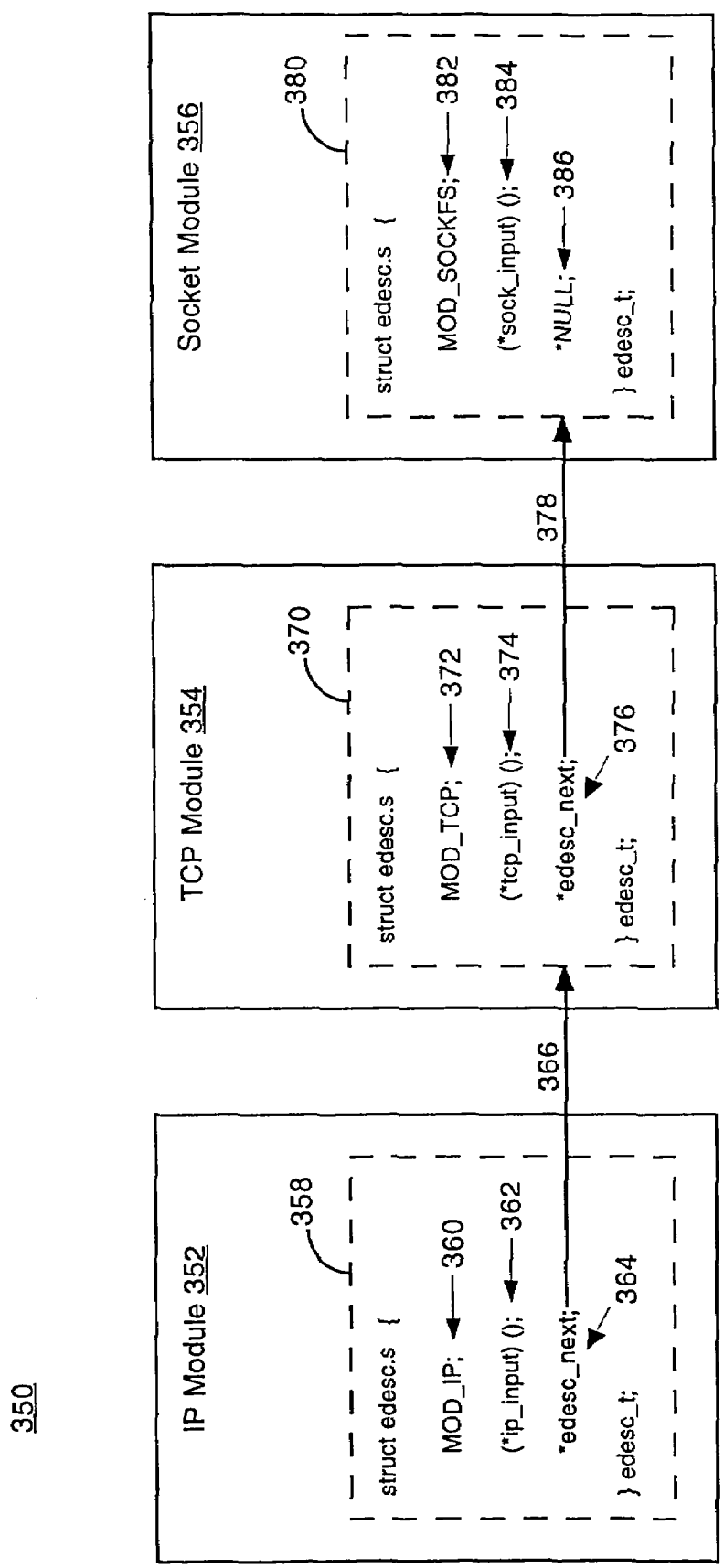
FIG. 3B is a block diagram of an exemplary event list in accordance with an embodiment of the present invention for an incoming communication packet.

For example, FIG. 3B is a block diagram of an exemplary event list 350 that identifies a sequence of modules that can be used to process an incoming communication packet in accordance with an embodiment of the present invention. Specifically, event list 350 includes an IP module 352, followed by a TCP module 354, that is followed by a socket module 356. It is noted that modules 352, 354 and 356 can be accessed from repository 316 of FIG. 3A as processing of event list 350 is performed.

The IP module 352, TCP module 354, and socket module 356 of FIG. 3B include event descriptors 358, 370 and 380, respectively, that make up event list 350. Within the present embodiment, the event descriptors 358, 370 and 380 each includes a data structure represented by exemplary pseudo code. This code is exemplary only and a variety of syntaxes could be used that accomplish the functionality of embodiments of the present invention. The IP module 352 includes an event descriptor 358 that includes an identifier unique to it shown as "MOD_IP;" at line 360, a function call shown as "(*ip_input) ();" at line 362 that will be called by IP module 352, and a pointer shown as "*edesc_next;" at line 364 that points to the next event descriptor in the event list 350 as shown by arrow 366. Additionally, the TCP module 354 includes an event descriptor 370 that includes an identifier unique to it shown as "MOD_TCP;" at line 372, a function call shown as "(*tcp_input) ();" at line 374 that will be called by TCP module 354, and a pointer shown as "*edesc_next;" at line 376 that points to the next event descriptor in the event list 350 as shown by arrow 378. Furthermore, the socket module 356 includes an event descriptor 380 that includes an identifier unique to it shown as "MOD_SOCKFS;" at line 382, a function call shown as "(*sock_input) ();" at line 384 that will be called by socket module 356, and a pointer shown as "*NULL;" at line 386 that is inactive since the event descriptor 380 is the last event descriptor of event list 350.

During processing of an incoming communication packet utilizing event list 350, the event descriptor 358 of the IP module 352 identifies that IP processing of the communication packet is required. As such, the function at line 362 of the event descriptor 358 is called to perform the IP processing of the communication packet. The pointer at line 364 indicates that the event descriptor 370 of the TCP module 354 is next in the event list 350. Therefore, the function at line 374 of the event descriptor 370 is called to perform the TCP processing of the communication packet. The pointer at line 376 indicates that the event descriptor 380 of the socket module 356 is next in the event list 350. As such, the function at line 384 of the event descriptor 380 is called to perform the socket processing of the communication packet. In this manner, a communication packet is processed utilizing event list 350.

Figure 4:
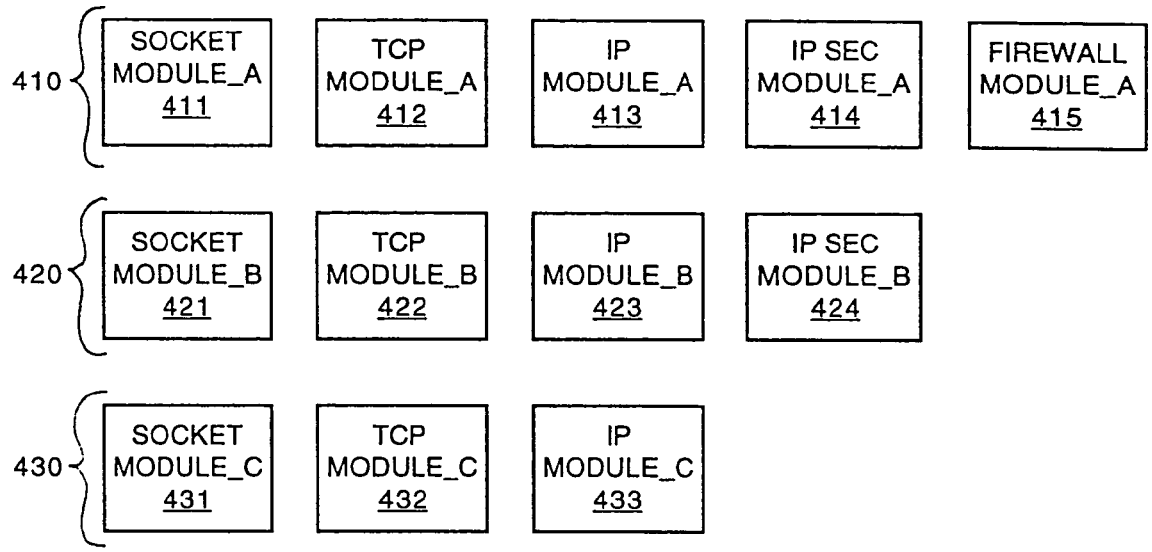
FIG. 4 is a block diagram of exemplary event lists stored in a database in accordance with embodiments of the present invention.
Figure 4:
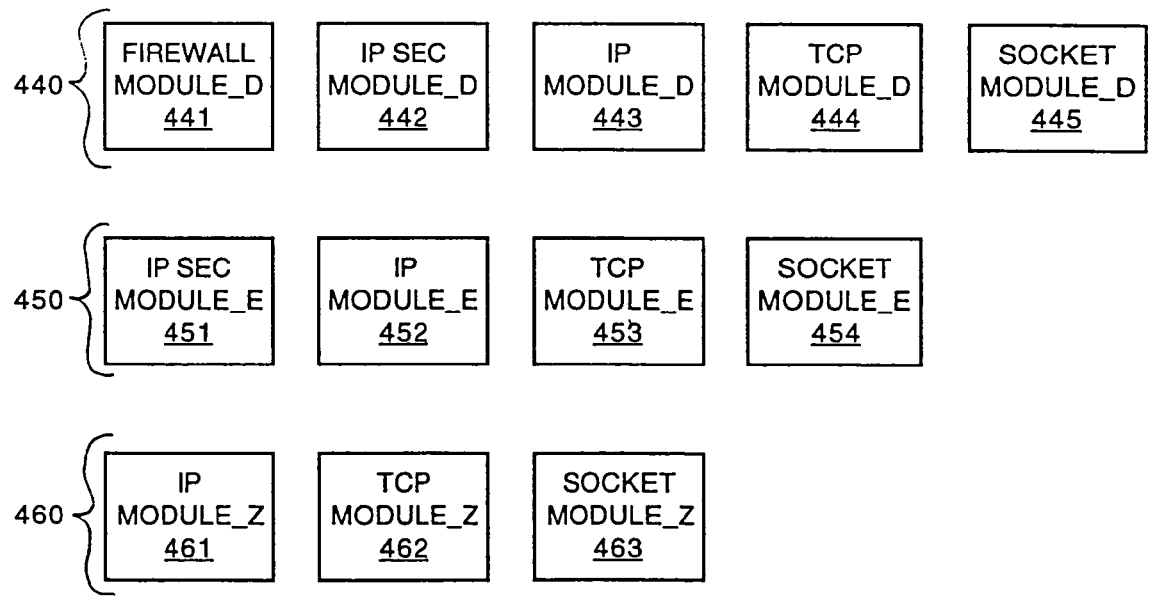

FIG. 4 is a block diagram of exemplary event lists that can be stored in database 312 (FIG. 3A) in accordance with embodiments of the present invention. Generally, each event list of the database is different from the others. Event lists 410, 420 and 430 identify a plurality of communication modules that can be used for processing outgoing communication packets from server 310 and provide an ordering of those communication modules. For example, send event list 410 comprises a sockets file system module_A 411, a transmission control protocol (TCP) module_A 412, an Internet Protocol (IP) module_A 413, an IP security module_A 414, and a firewall module_A 415. Send event list 420 comprises a sockets file system module_B 421, a TCP module_B 422, an IP module_B 423, and an IP security module_B 424. Send event list 430 comprises a sockets file system module_C 431, a TCP module_C 432, and an IP module_C 433. It is appreciated that in embodiments of the present invention, each of the sockets file system modules 411, 421 and 431 perform similar processing functionalities. Similarly, each of the TCP modules 412, 422 and 432 perform similar processing functionalities, each of the IP security modules 414 and 424 perform similar processing functionalities, etc.

Event lists 440, 450, and 460 identify a plurality of communication modules that can be used for processing incoming communication packets to server 310 and provide an ordering of those communication modules. For example, receive event list 440 includes a firewall module_D 441, an IP security module_D 442, an IP module_D 443, a TCP module_D 444 and a sockets file system module_D 445. Receive event list 450 includes an IP security module_E 451, an IP module_E 452, a TCP module_E 453, and a sockets file system module_E 454. Receive event list 460 includes an IP module_Z 461, a TCP module_Z 462, and a sockets file system module_Z 463. As described above, each of the similarly named modules provide similar processing functionalities. It is appreciated that embodiments of the present invention are not limited to these communication processing modules alone and may also perform other communication processing protocols such as NCA, CGTP, IP multipath, clustering, QOS, etc.

In embodiments of the present invention, each event descriptor which makes up the event list comprises a data structure as shown in the following exemplary pseudo code:

```
struct edesc.s   {
        int             edesc_modid;
        void            (*edesc_func) ( );
        struct edesc.s  *edesc_next;
} edesc_t;
```

This code is exemplary only and a variety of syntaxes could be used that accomplish the functionality of embodiments of the present invention. This example is shown only to aid in discussions of the operation of embodiments of the present invention.

In the above data structure example, the line "void (*edesc_func) ();" is a pointer to a function in an event list that is currently executing. For example, if IP module_Z 461 of receive event list 460 is processing a communication packet, this line indicates that IP module_Z 461 is currently executing that function of the event list.

The line "struct edesc.s *edesc_next;" indicates the next event descriptor corresponding to the next communication module in the event list that will perform processing of the communication packet. For example, if IP module_Z 461 of receive event list 460 is currently processing a communication packet, this line indicates the event descriptor of TCP module_Z 462 is the next in the event list. Thus, in embodiments of the present invention, each communication module is represented by an event descriptor which contains an identifier unique to it (e.g., edesc_modid), a function call (e.g., edesc_func) that will be called for by the particular communication module, and a pointer to the next event descriptor in the event list.

Additionally, in embodiments of the present invention, each processing module can manipulate its own function call based upon what processing needs to be performed. If the lookup of the event list and manipulation of the function call is protected by the vertical perimeter, there is no danger of pitfalls due to simultaneous modification and access in a multithreaded and multiprocessor environment. For example, while a TCP module (e.g., TCP module_Z 462 of FIG. 4) is executing, it can change its function pointer by changing what function is listed in the "void (*edesc_func) ();" line of the above pseudo code. In this way, a module can alter its entry point from data packet to data packet within the same connection. For example, when a connection is first established, the function called by TCP module_Z 462 may be tcp_input (e.g., the TCP module entry point is "tcp_input"). After the connection is established, TCP module_Z 462 can change the function pointer to tcp_data_input for subsequent packets. This is advantageous because a typical TCP communication module has a complex operational state machine. For example, a connection may go through 8 or 9 TCP operational states in the course of its existence. Conventionally, the TCP module has to determine what state the connection is in before invoking and performing the function call appropriate for that state. In embodiments of the present invention, since the TCP module can manipulate what function call is listed from packet to packet, it can move directly to performing the appropriate function without the discovery process. In other words, the TCP module can select an optimum entry point for the next data packet. It is noted that each module associated with the event list can write and/or manipulate its own portion of the event list.

In embodiments of the present invention, classifier 311 (FIG. 3A) selects a send event list and/or a receive event list when a connection is established. Selection of a particular event list is based upon administrative policies governing communications processing of the type associated with the connection. For instance, a different set of communications modules may be required for communication packets arriving from the Internet than for communication packets arriving from a LAN. For example, within FIG. 3A, connection 321 with client 320 may be an Internet connection and necessitate the implementation of additional security protocols on server 310. Conversely, connection 331 with client 330 may be a LAN connection and thus not require IP security and firewall protocols. In conventional communication processing, a communication packet may be examined by communication modules that are not needed for that particular connection. This results in redundant checks and overhead by each of the communication modules to determine whether a particular module is needed to perform communications processing. This overhead processing is virtually eliminated by the embodiments of the present invention.

In embodiments of the present invention, classifier 311 of FIG. 3A selects the send and/or receive event lists from event lists stored on database 312. These event lists are used as templates which are then referenced using the pointer (or reference) in the conn_t data structure. As a result, there is no need to create a new event list for each connection being established as multiple connection can share the same list. This is advantageous over conventional processing in that a particular event list can be selected for a connection that only performs the processing necessitated by that connection. For example, some communication packets may only require IP, TCP, and sockets file system processing. In that instance, classifier 311 places pointers to send event list 430 and receive event list 460 in the conn_t data structure for that connection. In another connection, the communication packets may require firewall, IP security, IP, TCP, and sockets file system processing. As such, classifier 311 would place pointers to send event list 410 and receive event list 440 in the conn_t data structure for that connection. In other words, the checks for determining which modules are required for communication processing are only performed once when the connection is being established.

As a result, redundant checks are not necessitated when processing communication packets individually. Because the event lists are already created and reside in database 312 of FIG. 3A, the only work being done is determining which event list should be used for a connection being established. When, for example, an incoming communications packet arrives at server 310, classifier 311 determines whether there is an existing connection. If there is not, classifier 311 examines the local and remote IP address and the local and remote port number of the connection. Using this information, classifier 311 determines the administrative policies governing this type of connection and places pointers to the appropriate event lists in the conn_t data structure for that connection. When a subsequent connection arrives for the same connection, classifier 311 determines what connection is being processed, by examining the local/remote IP address and port numbers, selects the appropriate conn_t data structure for that connection, and uses the receive event list for that connection. Outgoing communication packets for a connection are processed in a similar manner.

FIG. 5 shows exemplary memory resident connection data structures in accordance with embodiments of the present invention. In FIG. 5, conn_t a 313 comprises a data entity conn_recv 510, followed by pointer 511 (also called a "reference pointer") which points to the first communication module of the receive event list (e.g., firewall module_D 441 of FIG. 4) that is used when processing communication packets for the connection conn_t a 313 uniquely describes (e.g., connection 321). Conn_t a 313 also comprises a data entity conn_recv_current 520, followed by pointer 521 which indicates what communication module in the receive event list is currently performing processing of a communication packet. Conn_t a 313 also comprises a data entity conn_send 530, followed by pointer 531 which points to the first communication module of the send event list (e.g., socket module_A 411 of FIG. 4) that is used when processing communication packets for the connection conn_t a 313 uniquely describes (e.g., connection 321). Conn_t a 313 also comprises a data entity conn_send_current 540, followed by pointer 541 which indicates what communication module (e.g., socket module_A 411) in the send event list is currently performing processing of a communication packet.

In FIG. 5, conn_t b 314 comprises a data entity conn_recv 550, followed by pointer 551 which points to the first communication module of the receive event list (e.g., IP module_Z 461 of FIG. 4) that is used when processing communication packets for the connection conn_t b 314 uniquely describes (e.g., connection 331). Conn_t b 314 also comprises a data entity conn_recv_current 560, followed by pointer 561 (also called a "reference pointer") which indicates what communication module in the receive event list is currently performing processing of a communication packet (e.g., TCP module_Z 462 of FIG. 4). In the embodiment of FIG. 5, server 310 can be currently performing TCP processing of a communication packet received via connection 331. Conn_t b 314 also comprises a data entity conn_send 570, followed by pointer 571 which points to the first communication module of the send event list (e.g., socket module_C 431 of FIG. 4) that is used when processing communication packets for the connection conn_t b 314 uniquely describes (e.g., connection 331). Conn_t b 314 also comprises a data entity conn_send_current 580, followed by pointer 581 which indicates what communication module in the send event list is currently performing processing of the communication packet.

Within FIG. 5, it is noted that conn_t a 313 and conn_t b 314 may utilize different receive event lists (e.g., 440 and 460, respectively) and thus may utilize different pointers to their respective event lists (e.g., pointers 511 and 551, respectively). Additionally, conn_t a 313 and conn_t b 314 may utilize different send event lists (e.g., event lists 410 and 430, respectively) and thus may utilize different pointers to their respective send event lists (e.g., pointers 531 and 571, respectively). As described above with reference to FIG. 4, classifier 311 selects the event lists appropriate to a connection, as determined by the administrative policies governing communications processing.

In embodiments of the present invention, if an administrative policy is changed (IP security is enabled), classifier 311 places a pointer to the appropriate event lists (e.g., send event list 420 and receive event list 450) in the conn_t data structure for connections being established. Thus, the new administrative policy can be enabled without having to perform custom coding for the new communication module. As a result, changing administrative policy can be performed by embodiments of the present invention without the necessity of re-booting the server.

Figure 6A:
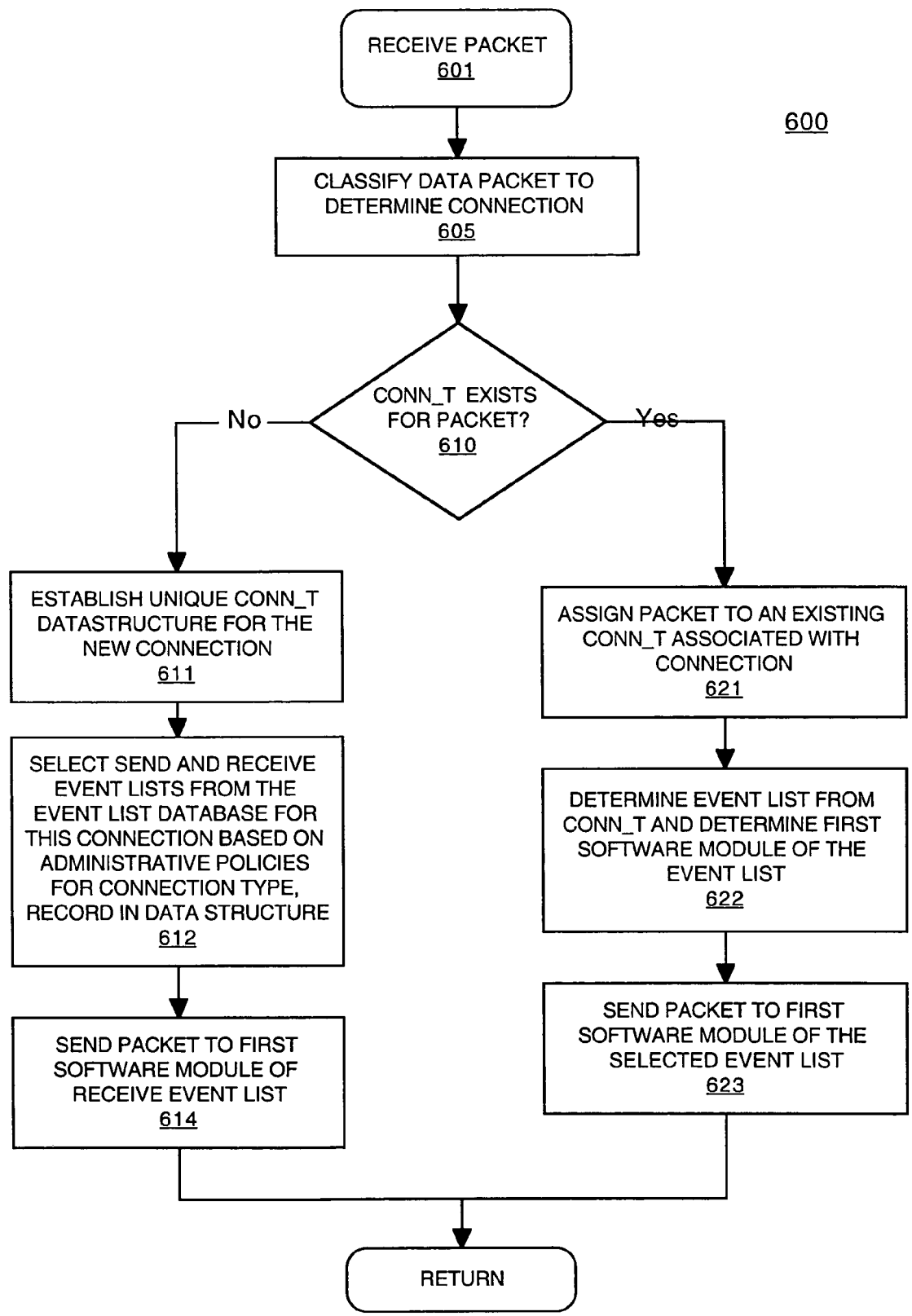
FIG. 6A is a flowchart of operations performed in accordance with an embodiment of the present invention for processing communication packets.

FIG. 6A is a flowchart 600 of operations performed in accordance with an embodiment of the present invention for processing communication packets. Flowchart 600 includes exemplary processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 600, such operations are exemplary. That is, the present embodiment is well suited to performing various other operations or variations of the operations recited in FIG. 6A. It is noted that the operations of flowchart 600 can be performed by software, by firmware, by hardware or by any combination thereof. Additionally, it is appreciated that the operations described in flowchart 600 describe processing performed upon a received data packet. However, it is appreciated that embodiments of the present invention can be performed upon send data packets as well.

In operation 601 of FIG. 6A, a communication packet is received by a device. For the purposes of the following discussion, it can be assumed that the data packet is received by server 310 from a client (e.g., 330 of FIG. 3A). However, method 600 may also be used to process outgoing communication packets sent, for example, from server 310 to a client (e.g., 330).

In operation 605, the data packet is classified to determine the connection to which the data packet belongs. In operation 605, the communications packet is classified to determine the connection. In embodiments of the present invention, classifier 311 of FIG. 3A can determine the connection based upon the local/remote IP addresses and the local/remote port numbers of the computers in the connection. In the present embodiment, classifier 311 can determine, based upon this information, that the communications packet belongs to connection 331 between client 330 and server 310.

In operation 610, a logical operation is performed to determine whether a conn_t data structure exists for the received communication packet. In one embodiment, the local/remote IP address of the computers in the communications connection, as well as the local/remote port numbers of the computers, are used to determine whether a conn_t data structure exists for the connection (e.g., 331 of FIG. 3A). If a conn_t data structure exists for this connection, the present embodiment proceeds to operation 620. If a conn_t data structure does not exist for this connection, the present embodiment proceeds to operation 611.

In operation 611 of FIG. 6A, a unique conn_t data structure is created for the new connection. In embodiments of the present invention, a unique conn_t data structure (e.g., conn_t b 314 of FIG. 5) is created for each communication connection when the connection is established. If a conn_t data structure does not already exist (as determined in operation 610), it is created for this connection.

In operation 612, an event list is selected for this connection from the event list database based upon administrative policies for this connection type and the event list is recorded in the data structure. In one embodiment, upon determining the connection type, classifier 311 of FIG. 3A determines the administrative policies that apply to the connection. For example, if the connection is via the Internet, the administrative policies may mandate a higher level of security processing (e.g., a firewall module, and an IP security module) than for a connection via a LAN. Classifier 311 can select an event list that identifies the communication modules used to implement the administrative policies applicable to that connection. In one embodiment, a database (e.g., 312 of FIG. 3A) lists a plurality of event lists that can be used to perform communications processing of the received communication packet. The event lists (e.g., send event list 430 and receive event list 460 of FIG. 4) are selected for that particular connection and are recorded in the conn_t data structure for that connection.

In operation 614, the communications packet is sent to the first software module in the receive event list. In the present embodiment, upon creating data structure conn_t b 314, conn_recv pointer 551 is read, and the packet is sent to IP module_Z 461 for communications processing. Alternatively, if a communications packet is being sent from server 310 to client 330, conn_send pointer 571 is read, and the packet is sent to socket module_C 431 for processing.

If, at operation 610 of FIG. 6A, it is determined that a conn_t data structure exists for the communications connection, the present embodiment proceeds to operation 621. In operation 621, the communications packet is assigned to an existing conn_t data structure associated with the connection. In the present embodiment, classifier 311 of FIG. 3A can determine that conn_t b 314 is the data structure uniquely assigned to connection 331 and the communications packet is assigned to conn_t b 314.

In operation 622 of FIG. 6A, an appropriate event list is determined from the conn_t and the first software module of the event list is determined. In the present embodiment, since the communications packet is being received by server 310, it will be processed by receive event list 460. The pointer (e.g., 551 of FIG. 5) to the first software module (e.g., IP module_Z 461 of FIG. 4) in the event list is read.

In operation 623, the communications packet is sent to the first software module in the selected event list. In the present embodiment, based upon the pointer to IP module_Z 461, as indicated by conn_recv pointer 551, the communications packet is then processed by IP module_Z 461.

Figure 6B:
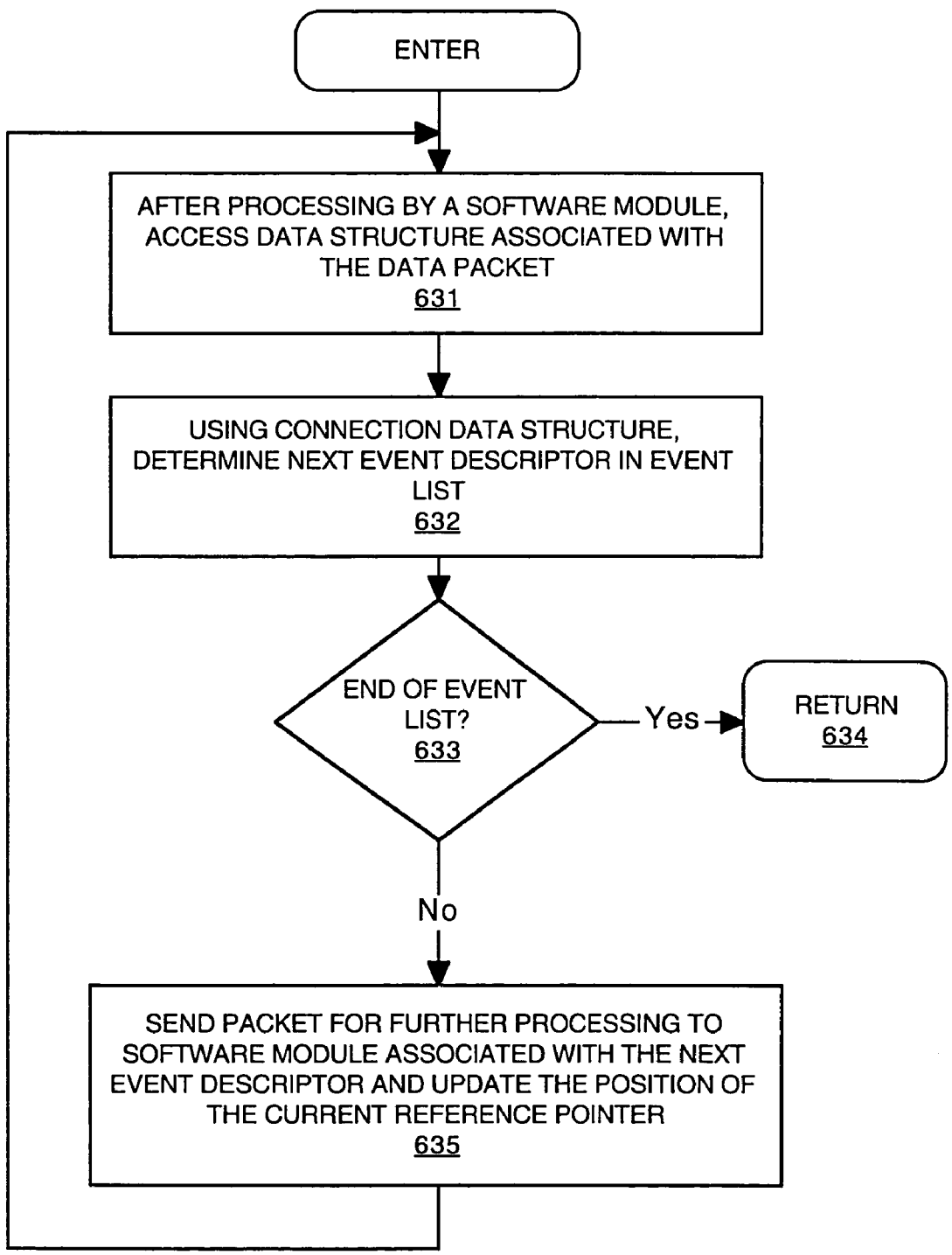
FIG. 6B is a flowchart of operations performed in accordance with an embodiment of the present invention for processing a data packet through an event list.

FIG. 6B is a flowchart 630 of operations performed in accordance with an embodiment of the present invention for processing a data packet through an event list. Flowchart 630 includes exemplary processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 630, such operations are exemplary. That is, the present embodiment is well suited to performing various other operations or variations of the operations recited in FIG. 6B. It is noted that the operations of flowchart 630 can be performed by software, by firmware, by hardware or by any combination thereof.

In operation 631 of FIG. 6B, after processing by a software module, a data structure associated with the communications module is accessed. Continuing with the example described herein with reference to FIG. 6A, after a communications packet has been processed by IP module_Z 461, data structure conn_t b 314 is accessed to continue processing the communications packet.

In operation 632, using the communication data structure (e.g., conn_t b 314), the next event descriptor is determined in the event list. For example, the reference pointer to the next event descriptor is determined in the event list (e.g., using conn_recv_current pointer 561 of FIG. 5). In embodiments of the present invention, a pointer to the currently processing communications module is also resident in conn_t b 314. A module sets this pointer to its own event descriptor at the start of the processing. Upon completion of the processing by the communication module (e.g., IP module_Z 461), the conn_recv_current pointer (e.g., 561) is referenced again to determine the current event descriptor and the next module (e.g. TCP module_Z 462 of FIG. 4) is determined from the next pointer.

In operation 633 of FIG. 6B, a logical operation is performed to determine whether the currently processing software module is the last in the event list. If the last module in the event list has performed its processing, the present embodiment returns to a wait state in operation 634.

If the event list has not completed processing of the communications packet, the present embodiment proceeds to operation 635 of FIG. 6B, wherein the packet is sent to the next module associated with the next event descriptor and the position of the current reference pointer in the data structure is updated. For example, after IP processing of the packet has been completed by IP module_Z 461, the packet is then processed by TCP module_Z 462 of FIG. 4. While the function invoked by TCP module_Z 462 is processing the communications packet, the conn_recv_current pointer 561 of data structure conn_t b 314 is updated to indicate that TCP module_Z 462 is now currently processing the data packet. Upon completion of TCP processing using TCP module_Z 462, the present embodiment proceeds to operation 631 again.

Figure 7:
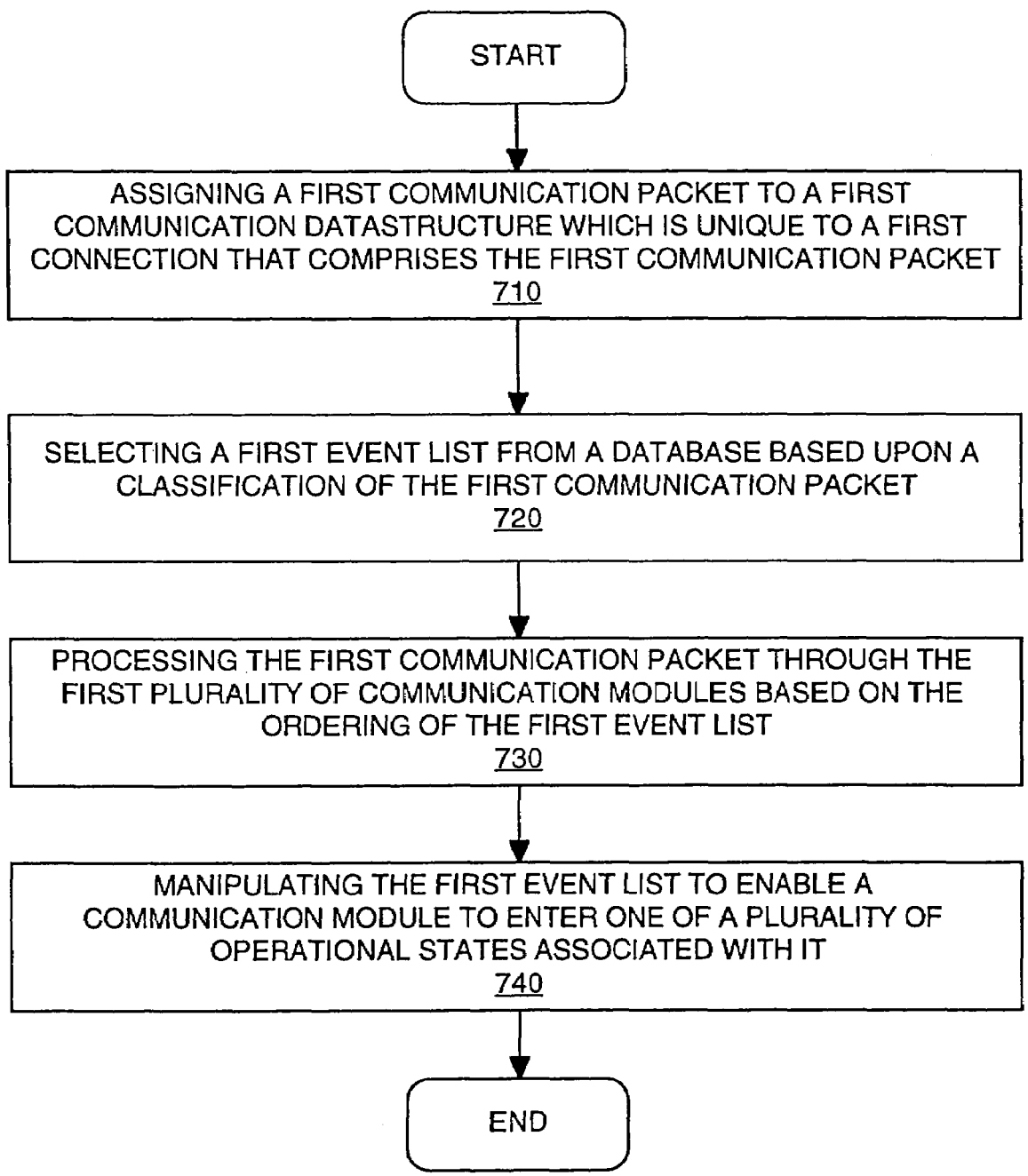
FIG. 7 is a flowchart of operations performed in accordance with another embodiment of the present invention for processing communication packets.

FIG. 7 is a flowchart 700 of operations performed in accordance with an embodiment of the present invention for processing communication packets. Flowchart 700 includes exemplary processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 700, such operations are exemplary. That is, the present embodiment is well suited to performing various other operations or variations of the operations recited in FIG. 7. It is noted that the operations of flowchart 700 can be performed by software, by firmware, by hardware or by any combination thereof.

In operation 710, a first communication packet is assigned to a first communication data structure which is unique to a first connection that includes said first communication packet. Within some embodiment of the present invention, whenever a communication connection is established, classifier 311 of FIG. 3A assigns a unique data structure (e.g., conn_t a 313, conn_t b 314, or conn_t z 315 of FIG. 3A) to each connection describing, for example, state information for the connection, pointers to other structures and functions, read and write queues, addresses and port numbers, data packet sequence numbers, etc. The first packet arriving for that connection is thus assigned to the first data structure (e.g., conn_t b 314 of FIG. 5). It is appreciated that the first communication packet can be a send communication packet from server 310 or a receive communication packet sent to server 310.

In operation 720 of FIG. 7, a first event list is selected from a database based upon a classification of the first communication packet. In some embodiments of the present invention, classifier 311 of FIG. 3A selects a send event list and a receive event list (e.g., send event list 430 and receive event list 460 of FIG. 4) from database 312 based upon the connection type and the administrative policies governing communication processing that apply to that connection type.

In embodiments of the present invention, classifier 311 of FIG. 3A determines which event lists to assign to a connection based upon the administrative policies governing communication processing as enforced at, for example, server 310. In embodiments of the present invention, classifier 311 determines the local/remote IP addresses and the local/remote port numbers of the server and client that are connected (e.g., server 310 and client 330 of FIG. 3A) to determine which administrative policies are applicable to a particular connection. As a result, classifier 311 determines which communication processing protocols are required to process a communication packet for that connection and selects the appropriate event lists to implement those processing protocols. In embodiments of the present invention, each send event list and each receive event list identifies a plurality of communication processing modules and an ordering of those modules for processing a communication packet.

In operation 730 of FIG. 7, the first communication packet is processed through the first plurality of communication modules based on the ordering of the first event list. In embodiments of the present invention, classifier 311 of FIG. 3A accesses a pointer to the first communication module of the first event list (e.g., pointer 551 of FIG. 5) in the data structure (e.g., conn_t b 314 of FIG. 5) to determine the first function to invoke to process the communication packet.

In embodiments of the present invention, the data structure (e.g., conn_t b 314 of FIG. 5) includes a pointer to the first communication module of the event list (e.g., pointer 551 of FIG. 5) and second pointer to the currently processing communication module (e.g., pointer 561). The processing of the communication packet is performed using the communication modules in the event list in the order designated by the event list. Because the classifier has determined which communication modules are necessary for processing the communication packet, none of the modules in the event list are required to perform checks to determine whether that module has to perform processing of the packet. Instead, in embodiments of the present invention, each communication module simply invokes the function call specified in the data structure (e.g., event descriptor) of the module.

At operation 740 of FIG. 7, the first event list is manipulated (or changed or modified) to enable a communication module of the first plurality of communication modules to enter one of a plurality of operational states associated with the communication module. Within one embodiment, each module can modify its own function call of the first event list based upon its operational state for that communication connection. For example, a TCP module (e.g., 462 of FIG. 4) can change its function within the event list depending upon its operational state of the connection. As a result, redundant checks to determine the communication module's state for a particular connection are eliminated in embodiments of the present invention. It is noted that the function call of a TCP module can include, but is not limited to, tcp_input, tcp_output, tcp_close_output, tcp_timewait_output, tcp_rsrv_input, and tcp_timer. Specifically, tcp_input can be associated with all inbound data packets and control messages. The tcp_output can be associated with all outbound data packets and control messages. The tcp_close_output is associated with the function when the client closes the communication connection. The tcp_timewait_output indicates that the timewait function is expiring while the tcp_rsrv_input indicates flow control relief on the read side. The tcp_timer can be associated with all TCP timers. In this manner, there are multiple entry points into the TCP module. As such, there are multiple entry points into the communication module of operation 740 that has multiple operational states. It is noted that the communication module of operation 740 that has multiple operational states is not limited to any particular communication module or protocol.

It is noted that the manipulating of the first event list at operation 740 enables the communication module (e.g., TCP module_Z 462) to move through each of its plurality of operational states. The operational states of the communication module can have a particular operational order and can be sequential. It is appreciated that the operational state of each communication module of the event list is stored by the event list. Upon completion of operation 740, process 700 can be exited.

It is understood that an embodiment of the present invention can handle more than one communication connection. For example, assuming the communication connection has been established as described with reference to FIG. 7. When a second communication packet for the first connection arrives at server 310 of FIG. 3A, classifier 311 can determine the connection by examining the local/remote IP addresses and the local/remote port numbers of the devices in the connection. This allows determining the particular connection to which the second communication packet belongs. Classifier 311 then can access the data structure for that connection (e.g., conn_t b 314 of FIG. 5) to determine which event list to access to process the second communication packet. The second communication packet is then processed by invoking the function of the first communication module in that event list (e.g., IP module_Z 461 of FIG. 4).

However, when a third communication packet arrives at server 310 from a second connection, classifier 311 determines what administrative policies governing communication processing apply to the second connection. Classifier 311 then selects a send event list and a receive event (e.g., send event list 410 and receive event list 440 of FIG. 4) list from database 312 and places pointers to the first communication modules of those event lists in a data structure unique to the second connection (e.g., conn_t a 313 of FIG. 5).

When a fourth communication packet arrives at server 310 from the second connection, classifier 311 determines the connection by examining the local/remote IP addresses and the local/remote port numbers of the computers in the connection. This allows determining the particular connection (e.g., the second connection) to which the fourth communication packet belongs. Classifier 311 then accesses the data structure for that connection (e.g., conn_t a 313 of FIG. 5) to determine which event list to access to process the fourth communication packet. The fourth communication packet is then processed by invoking the function of the first communication module in that event list (e.g., firewall module_D 441 of FIG. 4).

It is noted that the each event list associated with the first and second connections can be manipulated (or changed or modified) to enable a communication module associated with each event list to enter one of a plurality of operational states associated with each communication module. Within one embodiment, each module can modify its own function call of associated with the event list based upon its operational state for that communication connection.

Figure 8:
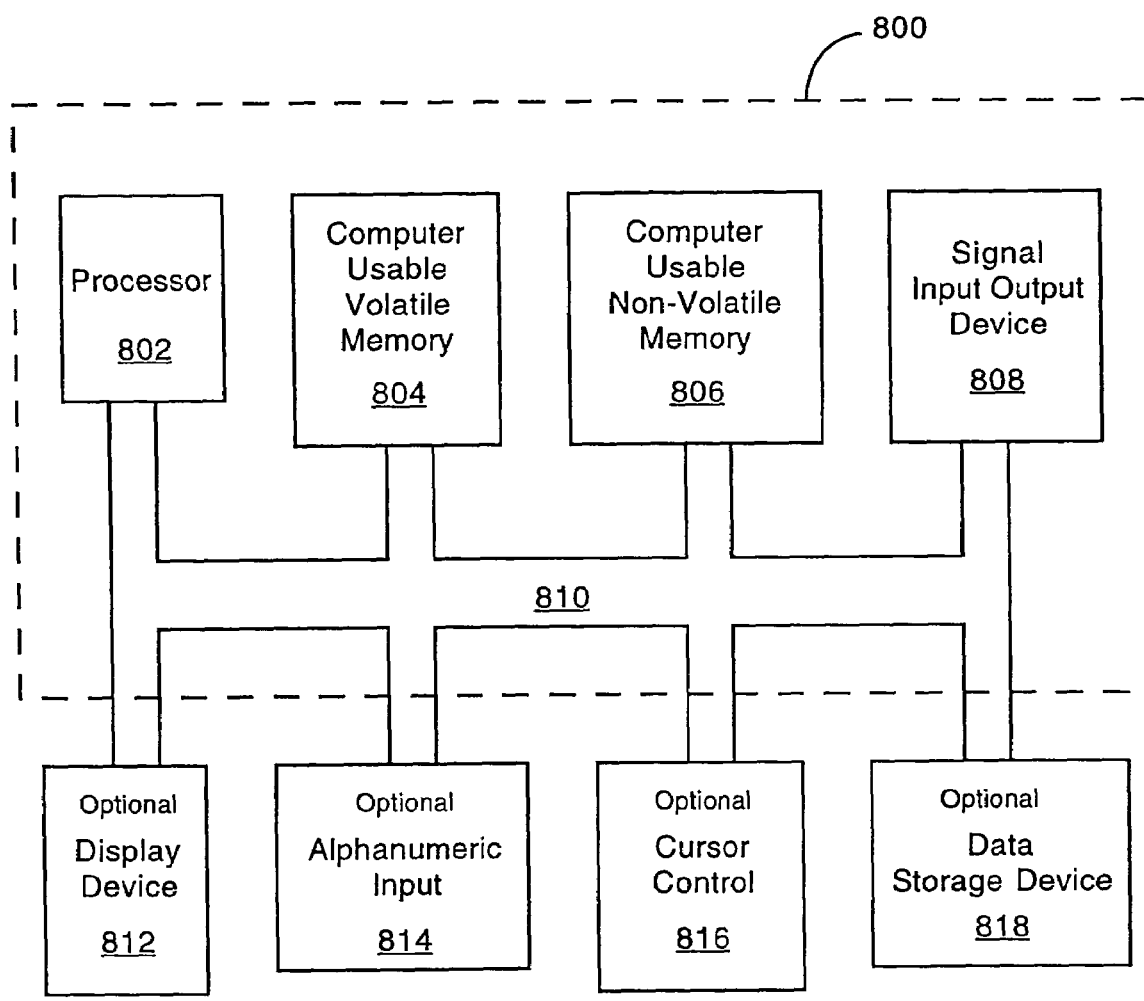
FIG. 8 is a block diagram of an exemplary computer system that can be used in accordance with embodiments of the present invention.

FIG. 8 is a block diagram of an exemplary computer system 800 that may be used in accordance with embodiments of the present invention. For example, client 102 and server 104 of FIG. 1, server 200 of FIG. 2, server 310 and clients 320, 330 and 340 of FIG. 3A may each be implemented in a manner similar to computer system 800. However, each is not limited to such an implementation. It is understood that system 800 is not strictly limited to be a computer system. As such, system 800 of the present embodiment is well suited to be any type of computing device (e.g., server computer, desktop computer, laptop computer, portable computing device, etc.). Within the discussions of embodiments in accordance with the present invention herein, certain processes and operations were discussed that may be realized, in some embodiments, as a series of instructions (e.g., software program) that reside within computer readable memory of computer system 800 and executed by a processor(s) of system 800. When executed, the instructions cause computer 800 to perform specific operations and exhibit specific behavior which are described herein.

Computer system 800 comprises an address/data bus 810 for communicating information, one or more central processors 802 coupled with bus 810 for processing information and instructions. Central processor unit(s) 802 may be a microprocessor or any other type of processor. The computer 800 also includes data storage features such as computer usable volatile memory 804, e.g., random access memory (RAM), static RAM (SRAM), dynamic RAM (DRAM), etc., coupled with bus 810 for storing information and instructions for central processor(s) 802, computer usable non-volatile memory 806, e.g., read only memory (ROM), programmable ROM, flash memory, erasable programmable read only memory (EPROM), electrically erasable programmable read only memory (EEPROM), etc., coupled with bus 810 for storing static information and instructions for processor(s) 802.

System 800 of FIG. 8 also includes one or more signal generating and receiving devices 808 coupled with bus 810 for enabling system 800 to interface with other electronic devices. The communication interface(s) 808 of the present embodiment may include wired and/or wireless communication technology. For example, in one embodiment of the present invention, the communication interface 808 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 808 may include a cable modem or a DSL modem. Additionally, the communication interface(s) 808 may provide a communication interface to the Internet.

Optionally, computer system 800 can include an alphanumeric input device 814 including alphanumeric and function keys coupled to the bus 810 for communicating information and command selections to the central processor(s) 802. The computer 800 can also include an optional cursor control or cursor directing device 816 coupled to the bus 810 for communicating user input information and command selections to the processor(s) 802. The cursor directing device 816 can be implemented using a number of well known devices such as a mouse, a track ball, a track pad, an optical tracking device, a touch screen, etc. Alternatively, it is appreciated that a cursor can be directed and/or activated via input from the alphanumeric input device 814 using special keys and key sequence commands. The present embodiment is also well suited to directing a cursor by other means such as, for example, voice commands.

The system 800 of FIG. 8 can also include a computer usable mass data storage device 818 such as a magnetic or optical disk and disk drive (e.g., hard drive or floppy diskette) coupled with bus 810 for storing information and instructions. An optional display device 812 is coupled to bus 810 of system 800 for displaying video and/or graphics. It should be appreciated that optional display device 812 may be a cathode ray tube (CRT), flat panel liquid crystal display (LCD), field emission display (FED), plasma display or any other display device suitable for displaying video and/or graphic images and alphanumeric characters recognizable to a user.

It is noted that the components associated with system 800 described above may be resident to and associated with one physical computing device. However, one or more of the components associated with system 800 may be physically distributed to other locations and be communicatively coupled together (e.g., via a network).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of processing communication packets comprising:
    assigning a first communication packet to a first communication data structure which is unique to a first connection that comprises said first communication packet;
    selecting a first event list from a database, said first event list selected based on a classification of said first communication packet, said first event list identifying a first plurality of communication modules specific for said first connection and an ordering thereof, each communication module of the first plurality of communication modules in the first event list configured to manipulate the corresponding communication module portion of the first event list so that subsequent packets can use the manipulated one or more of the first plurality of communication modules in first event list for processing;
    processing said first communication packet through said first plurality of communication modules based on said ordering of said first event list; and
    manipulating said first event list to enable a communication module of said first plurality of communication modules to enter one of a plurality of operational states associated with said communication module.

2. A method as described in claim 1 wherein said manipulating said first event list enables said communication module to move through each of said plurality of operational states.

3. A method as described in claim 2 wherein said plurality of operational states has an order.

4. A method as described in claim 1 further comprising classifying said first communication packet to determine which communication modules are required for processing thereof, said classifying performed before said selecting.

5. A method as described in claim 1 wherein said first communication packet is an initial communication packet of a plurality of communication packets of said first connection.

6. A method as described in claim 5 further comprising:
    accessing a second communication packet of said first connection;
    accessing said first communication data structure to identify said first event list associated with said first connection; and
    processing said second communication packet through said plurality of communication modules based on said ordering.

7. A method as described in claim 6 wherein said communication modules comprise function call interfaces.

8. A method as described in claim 6 wherein said communication packets are send or receive communication packets.

9. A method as described in claim 1 wherein said first data structure comprises a first pointer to the first communication module of said first event list and a second pointer which points to the currently processed communication module during said processing of said first event list.

10. A method as described in claim 1 further comprising:
    assigning a third communication packet to a second communication data structure that is unique to a second connection that comprises said third communication packet;
    selecting a second event list from said database, said second event list selected based on a classification of said third communication packet, said second event list identifying a second plurality of communication modules specific for said second connection and an ordering thereof, each communication module of the second plurality of communication modules in the second event list configured to manipulate the corresponding communication module portion of the second event list so that subsequent packets can use the manipulated one or more of the second plurality of communication modules in second event list for processing, wherein said first plurality of communication modules is different from said second plurality of communication modules;
    processing said third communication packet through said second plurality of communication modules based on said ordering of said second event list; and
    manipulating said second event list to enable a communication module of said second plurality of communication modules to enter one of a plurality of operational states associated with said communication module.

11. A method as described in claim 10 wherein said third communication packet is an initial communication packet of a plurality of communication packets of said second connection.

12. A method as described in claim 10 further comprising:
    accessing said fourth communication packet associated with said second connection;
    accessing said second communication data structure to identify said second event list associated with said second connection; and
    processing said fourth communication packet through said second plurality of communication modules based on said ordering of said second event list.

13. A method as described in claim 10 wherein said second data structure comprises a first pointer to the first communication module of said second event list and a second pointer which points to the currently processed communication module during said processing of said second event list.

14. A method as described in claim 10 further comprising classifying said third communication packet to determine which communication modules are required for processing thereof, said classifying of said third communication packet performed before said selecting of said second event list.

15. A method as described in claim 10 wherein said communication modules comprise function call interfaces.

16. A method of processing communication packets within a communication framework comprising a first plurality of modules, said method comprising:
   assigning a first communication packet to a first communication data structure which is unique to a first connection that comprises said first communication packet;
   selecting a first event list from a database, said first event list selected based on a classification of said first communication packet, said first event list identifying a second plurality of modules specific for said first connection and an ordering thereof, each module of the second plurality of modules in the first event list configured to manipulate the corresponding module portion of the first event list so that subsequent packets can use the manipulated one or more of the second plurality of modules in the first event list for processing, wherein said second plurality is a subset of said first plurality;
   processing said first communication packet through said second plurality of modules based on said ordering of said first event list; and
   changing said first event list to enable a module of said second plurality of modules to enter one of a plurality of operational states associated with said module.

17. A method as described in claim 16 wherein said changing said first event list enables said module to pass through each of said plurality of operational states.

18. A method as described in claim 17 wherein said plurality of operational states has an operational order.

19. A method as described in claim 16 further comprising classifying said first communication packet to determine which modules are required for processing thereof, said classifying performed before said selecting.

20. A method as described in claim 16 wherein said first communication packet is an initial communication packet of a plurality of communication packets of said first connection and further comprising:
   accessing a second communication packet of said first connection;
   accessing said first communication data structure to identify said first event list associated with said first connection; and
   processing said second communication packet through said second plurality of modules based on said ordering.

21. A method as described in claim 16 wherein said first data structure comprises a first pointer to the first module of said first event list and a second pointer which points to the currently processed module during said processing of said first event list.

22. A method as described in claim 16 further comprising:
   assigning an third communication packet to a second communication data structure that is unique to a second connection that comprises said third communication packet;
   selecting a second event list from said database, said second event list selected based on a classification of said third communication packet, said second event list identifying a third plurality of modules specific for said second connection and an ordering thereof, each communication module of the third plurality of modules in the second event list configured to manipulate the corresponding communication module portion of the second event list so that subsequent packets can use the manipulated one or more of the third plurality of communication modules in second event list for processing, wherein said third plurality is a subset of said first plurality and wherein further said second plurality is different from said third plurality;
   processing said third communication packet through said third plurality of modules based on said ordering of said second event list; and
   manipulating said second event list to enable a module of said third plurality of modules to enter one of a plurality of operational states associated with said module.

23. A method as described in claim 22 wherein said third communication packet is an initial communication packet of a plurality of communication packets of said second connection and further comprising:
   accessing a fourth communication packet associated with said second connection;
   accessing said second communication data structure to identify said second event list associated with said second connection; and
   processing said fourth communication packet through said third plurality of modules based on said ordering of said second event list.

24. A method as described in claim 22 wherein said second data structure comprises a first pointer to the first communication module of said second event list and a second pointer which points to the currently processed module during said processing of said second event list.

25. A method as described in claim 22 further comprising classifying said third communication packet to determine which modules are required for processing thereof, said classifying of said third communication packet performed before said selecting of said second event list.

26. A communication system comprising:
   a) a first plurality of communication modules for processing communication packets, each communication module of the first plurality of communication modules configured to manipulate the corresponding communication module portion so that subsequent packets can use the manipulated one or more of the first plurality of communication modules for processing;
   b) a database comprising:
      a first event list indicating a second plurality of communication modules for processing communication packets and an ordering thereof and wherein said second plurality is a subset of said first plurality,
      a communication module of said second plurality of communication modules for modifying said first event list; and a second event list indicating a third plurality of communication modules for processing communication packets and an ordering thereof and wherein said third plurality is a subset of said first plurality and is different from said second plurality,
      a communication module of said third plurality of communication modules for modifying said second event list; and
   c) a classifier for classifying respective communication packets and based thereon for assigning respective communication packets to one of said first and second event lists for processing thereof and wherein communication packets of a common communication connection are processed through the same event list.

27. A communication system as described in claim 26 wherein said communication module of said second plurality of communication modules for modifying said first event list to enter one of a plurality of operational states associated with said communication module of said second plurality of communication modules.

28. A communication system as described in claim 27 wherein said communication module of said third plurality of communication modules for modifying said second event list to enter one of a plurality of operational states associated with said communication module of said third plurality of communication modules.

29. A communication system as described in claim 27 wherein said communication module of said second plurality of communication modules for modifying said first event list to move through each of said plurality of operational states.

30. A communication system as described in claim 29 wherein said plurality of operational states has an order.

31. A communication system as described in claim 26 further comprising a plurality of data structures, each data structure associated with a respective communication connection and indicating an event list to be used for processing communication packets of said respective communication connection.

32. A communication system as described in claim 26 wherein said communication modules are function call modules.

33. A communication system as described in claim 26 wherein said communication packets are send communication packets.

34. A communication system as described in claim 26 wherein said communication packets are receive communication packets.

* * * * *